Feb. 18, 1936.    J. W. ANDERSON    2,031,297
WINDSHIELD WIPER
Filed June 5, 1931
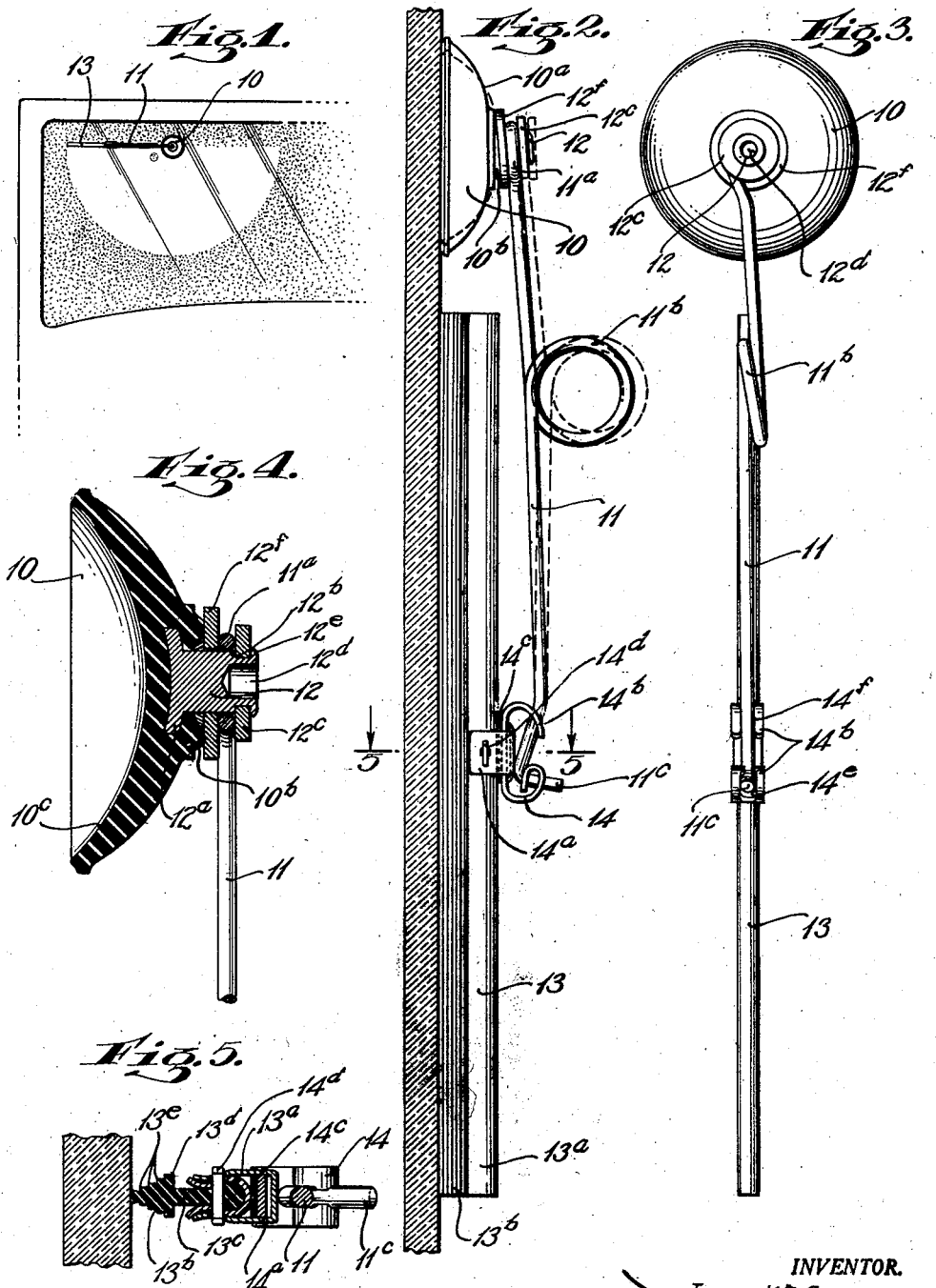
INVENTOR.
JOHN W. ANDERSON
BY
ATTORNEYS.

Patented Feb. 18, 1936

2,031,297

UNITED STATES PATENT OFFICE 2,031,297

WINDSHIELD WIPER

John W. Anderson, Gary, Ind.

Application June 5, 1931, Serial No. 542,310

6 Claims. (Cl. 15—255)

This invention relates to devices for wiping films of dust, moisture, oleaginous material, and the like from the windshields or observation panes of vehicles.

An object of the present invention is to provide a wiper which can be applied at random to any selected position on the pane without the necessity of altering the pane or its frame in any way, the wiper being adapted to be attached to the pane by merely pressing a suction cup thereagainst, the suction cup serving to support pivotally a resilient wiper arm carrying a wiper blade.

Another object of the present invention is to provide a wiper of the character indicated, which is inexpensive to manufacture, of compact durable construction, and of high efficiency in service.

In the accompanying drawing:

Figure 1 is a rear view of an automobile windshield having applied thereto one of the improved wipers embodying the present invention, the pane being shown with a portion of its area covered with a vision obscuring film, and a semi-circular portion of its area wiped clean of such film by the action of the wiper;

Fig. 2, a side view on an enlarged scale, of the construction shown in Fig. 1, the position of the parts immediately prior to compression of the suction cup against the pane, being indicated in dotted lines;

Fig. 3, a top plan view of the device;

Fig. 4, a sectional view taken diametrically through the suction cup and its associated parts; and Fig. 5, a transverse section taken on the line 5—5 of Fig. 2.

In the practice of the invention, referring descriptively to the specific embodiment thereof exemplified in the accompanying drawing, the wiper comprises a suction cup 10, a spring arm 11 having one end pivotally connected to the suction cup, a stud 12 having one end embedded centrally in the suction cup and its other end projected rearwardly from the suction cup to provide an arbor for the pivotal attachment of a loop 11a at one end of the wiper arm; and a wiper blade 13 detachably connected to one end of the wiper arm, with the capacity of flop, by a clip 14.

The suction cup 10 is preferably in the form of a concavo-convex disk and may be made of soft rubber, or other suitable freely elastic material, adapted when compressed to take a suction grip on a smooth surface. The convex or outer wall 10a of the cup is formed centrally with an annular rib or boss 10b adapted to cooperate with parts, which will hereafter be described, to hold the windshield wiper in raised position when out of use.

The stud 12 is formed at one end with an annular flange 12a which is embedded centrally in the wall of the suction cup, being spaced from the inner surface 10c thereof. This construction obviates an opening through the wall of the suction cup, and consequently eliminates danger of air leakage which would impair the suction effect of the cup. The outer end of the stud is formed with a reduced portion to provide a shoulder 12b, on which reduced portion and against which shoulder a washer 12c is fitted. To provide for locking the washer 12c in place on the stud, the stud is formed with a concentric, axial, cylindrical bore or recess 12d. This construction enables the rim at the outer end of the stud to be turned over to provide an annular retaining flange 12e. The loop 11a on the wiper arm is fitted on the shank of the stud next to the washer 12c. There is also fitted on the shank of the stud a washer 12f which is interposed between the loop 11a of the wiper arm and the yielding annular rib or shoulder 10b of the suction cup. This construction functions to press the wiper arm against the windshield pane, and co-operates with the arm to exert sufficient pressure to hold the arm and its attached blade at any desired raised position, such as indicated in Fig. 1, when the wiper is not being oscillated to clear the pane.

The wiper arm 11 is preferably made of spring wire, and is formed intermediate its length with a loop or convolution 11b, that serves both to increase the resiliency of the arm, and to provide a handle by which the arm may be conveniently oscillated across the pane. The arm possesses such shape and resiliency that it will hold the wiper blade against the pane with a yielding pressure.

The wiper blade 13 may be of any suitable construction, but as shown comprises a channeled U-shape metal back 13a, and a rubber wiping strip 13b. The wiper strip has a shank 13c formed at its inner end with a cylindrical bead which is fitted in the channel of the metal back 13a. At the outer end of the shank the wiper strip is formed with an enlarged head 13d, provided on each side with a plurality of longitudinal wiping edges or arrises 13e. The side walls of the metal back 13a are flared at their outer edges at the line of bend of the shank 13c, to prevent the shank from being cut in flexing, and to reinforce it during flexure.

The clip 14 for attaching the wiper blade to the arm 11, comprises a U-shape plate 14a, a socket member 14b, and a spring 14c interposed between the socket member and the metal back 13a of the blade. The legs of the U-shaped plate straddle the metal back 13a of the wiper blade and are connected thereto by a cotter pin 14d which passes through registering openings in the back, wiper strip, and legs. One end of the wiper arm is bent outward at substantially a right angle to provide a lug or hook 11c adapted to engage in one of the sockets 14e of the member 14b of the clip. The shank of the arm fits in the other socket 14f of the member 14b. By referring to the drawing, it will be readily apparent that the connection between the socket member 14b and the arm 11 does not permit play between those parts, such play as is necessary to obtain the desired flop of the blade, being permitted by the spring 14c and the loose fit between the socketed member 14b, and the back 13a of the wiper blade.

While the improved wiper is shown in Fig. 1 with the suction cup disposed at the upper portion of the pane, so that the swing of the blade is in a path substantially similar to that traversed by a hanging pendulum, it is to be understood that the suction cup may be applied at a lower position so that the blade may be moved in a semi-circular sweep above the suction cup. This latter positioning of the wiper on the pane is advantageous when oleaginous film is encountered, as it permits the material accumulated by the blade in its traverse across the pane, to flow down the pane away from the blade by the action of gravity, thus preventing such substance from clinging to the blade with consequent continuous smearing of the pane.

The described wiper possesses the highly important advantage that it can be applied to any desired position on the windshield or window panes of an automobile or other vehicle, without the necessity of making any alterations in the structure of the panes or their supporting frames, it being merely necessary to press the suction cup against the pane in order to securely affix the wiper in position for effective wiping operation. It is well known to vehicle operators, that the inner side of windshields and window panes frequently become coated with films of moisture, frost, or oleaginous substances, seriously impairing their transparency. When such conditions arise the operator can expeditiously and effectively clear the panes by merely pressing the suction cup against them at any desired position, and then oscillating the blade back and forth thereacross. When it is desired to dispose the blade out of the field of vision, and in a convenient position for subsequent use, it is merely necessary to elevate it as shown in Fig. 1, in which position it will be held by the combined pressures of the arm 11 and the yielding rib 10b of the suction cup.

When desired, the wiper may be detached from the pane, by loosening the suction cup therefrom, and stored in any convenient place on the vehicle.

While one of the preferred embodiments of the present invention has been illustrated and described, it is to be understood that various modifications in the material, form, and assembly of the parts may be resorted to without departing from the spirit and scope of the invention as set forth in the appended claims.

The invention claimed and desired to be secured by Letters Patent is:

1. In a wiper of the character described, the combination of a cup having an inner and an outer surface, the inner surface having a form providing a suction cavity, and the outer surface having a form providing a yielding rib; a stud having one end embedded in the wall of the cup, and a shank portion projecting beyond the rib; a washer fitted on the shank and abutting against the rib; a wiper arm having a loop pivotally mounted on the shank of the stud and abutting against the washer; a second washer fitted on the stud and abutting against the loop of the wiper arm; and a wiper blade connected to the arm.

2. In a wiper of the character described, the combination of a rubber suction cup having an inner surface defining a suction cavity, and an outer surface formed to provide an annular rib centrally of the cup; means for attaching a wiper arm to the cup, comprising an anchor embedded in the wall of the cup and a shank projecting beyond the wall of the cup and spaced from the rib, the outer end of the shank being reduced to provide a shoulder; a pair of spaced washers on the shank, the first of which bears against the rib of the cup and the second of which bears against the shoulder on the shank, the shank being formed with an out-turned flange securing the second washer thereon; a wiper arm having a loop fitted on the shank and disposed between the two washers; and a wiper blade connected to the arm.

3. In a wiper of the character described, a suction cup of resilient material, a wiper arm, a pivotal connection between said cup and arm, and means engaging with said resilient cup material and compressing and maintaining a portion thereof under compression, said means being operatively related to said arm for providing a frictional resistance thereto to prevent idle pivotal movement of said arm with relation to said cup, said frictional resistance being controlled by the resiliency of the portion of said cup material under compression.

4. In a wiper of the character described, a suction cup of resilient material, a wiper arm, a wiper blade mounted on said arm, a pivotal connection between said cup and arm and means engaging with said resilient cup material and compressing and maintaining a portion thereof under compression, said means being operatively related to said arm for providing a frictional resistance thereto to prevent idle pivotal movement of the arm and blade with relation to said cup, said frictional resistance being controlled by the resiliency of the portion of said cup material under compression.

5. In a wiper of the character described, the combination of a suction cup having a resilient compressible projection thereon, a wiper arm, an assembly secured to the cup compressing said projection and having said arm pivotally attached thereto, said assembly embodying frictional surfaces contacting said arm continuously with a force exerted by said projection substantially equal to the force exerted by said assembly in the compression of said projection, and assembly retaining means for maintaining compression of said projection by said assembly.

6. In a device of the class described, the combination of a resilient suction cup, an arm adapted to actuate a wiper blade, means secured to the cup for attaching said arm thereto and compressing a portion of the cup, said means consisting of an assembly having opposing frictional surfaces contacting said arm under the influence of the energy stored in the compressed portion of the cup, said surfaces being actuated toward said arm by the force exerted by said compressed portion of said cup.

JOHN W. ANDERSON.